United States Patent [19]

Mercer

[11] Patent Number: 4,618,385
[45] Date of Patent: Oct. 21, 1986

[54] PRODUCTION OF PLASTIC MESH

[75] Inventor: Frank B. Mercer, Blackburn, England

[73] Assignee: P.L.G. Research Limited, Blackburn, England

[21] Appl. No.: 765,186

[22] Filed: Aug. 13, 1985

Related U.S. Application Data

[63] Continuation of Ser. No. 510,252, Jul. 1, 1983, abandoned.

[30] Foreign Application Priority Data

Jul. 6, 1982 [GB] United Kingdom ............... 8219477

[51] Int. Cl.⁴ ..................... B29C 55/06; B29C 55/14
[52] U.S. Cl. .................................. 156/229; 156/177; 264/288.8; 264/DIG. 47; 264/DIG. 81
[58] Field of Search ............... 264/288.8, 145, 154, 264/156, DIG. 47, DIG. 81; 156/177, 229

[56] References Cited

U.S. PATENT DOCUMENTS

| | | | |
|---|---|---|---|
| 3,255,065 | 6/1966 | Wyckoff | 264/156 |
| 3,300,366 | 1/1967 | Krolik, Jr. | 264/DIG. 47 |
| 3,386,876 | 6/1968 | Wyckoff | 264/288.8 |
| 3,441,638 | 4/1969 | Patchell et al. | 264/154 |
| 3,950,475 | 4/1976 | Don et al. | 264/DIG. 47 |
| 4,013,752 | 3/1977 | Kalwaites et al. | 264/DIG. 47 |
| 4,140,826 | 2/1979 | Lui | 264/288.8 |
| 4,186,781 | 2/1980 | Kim et al. | 139/420 R |
| 4,303,714 | 12/1981 | Mercer | 264/288.8 |
| 4,374,798 | 2/1983 | Mercer | 264/288.8 |

FOREIGN PATENT DOCUMENTS 94251 12/1972 Fed. Rep. of Germany ... 264/288.8

*Primary Examiner*—James Lowe
*Attorney, Agent, or Firm*—Holman & Stern

[57] ABSTRACT

In order to produce a biaxially orientated mesh structure using a single axis draw, a plastics material starting material has parallel, side-by-side main zones separated by lines of holes or depressions; the starting material is drawn parallel to the main zones, stretching the main zones into continuous, orientated main strands 4 interconnected by smaller cross-section strands 6 which have been formed from the zones between holes or depressions in each line, and have been orientated at right angles to the direction of drawing by the effect of the main zones decreasing in width as they were stretched. The mesh structure is suitable for cross-lamination.

27 Claims, 14 Drawing Figures

PRODUCTION OF PLASTIC MESH

This is a continuation of application Ser. No. 510,252, filed July 1, 1983, now abandoned.

BACKGROUND OF THE INVENTION

1. Field of the Invention

The present invention relates to a method of making a mesh structure comprising providing a starting material which has substantially parallel lines of holes or depressions defining elongate, side-by-side main zones between the lines of holes or depressions and intermediate zones between the holes or depressions in each line, and drawing the starting material in a direction substantially parallel to the main zones to stretch the starting material out into a mesh structure having orientated main zones with the orientations therein extending generally parallel to the drawing direction.

2. Description of the Related Art

GB No. 2 073 090B discloses such a method, used for making uniaxially-orientated structures, and GB No. 2 035 191B discloses similar starting materials, being stretched in two directions at right angles to form biaxially-orientated structures. GB No. 2 073 090B and GB No. 2 035 191B can also be referred to for background details on stretching and orientating plastics materials.

In the uniaxially-stretched materials of GB No. 2 073 090B, the parts of the main zones which are directly between holes or depressions stretch out, forming strands interconnecting bars which comprise the remainder of the main zones and also the intermediate zones. In order to obtain biaxial orientation, the structure must be stretched in the direction at right angles, as set out in GB No. 2 035 191A.

U.S. Pat. No. 3,906,073, U.S. Pat. No. 3,719,540 and U.S. Pat. No. 3,500,627 disclose products which apparently have main, orientated strands with the orientation therein extending from end to end. In each case, the main strands are interconnected at a plurality of positions spaced along the main strands by orientated fibrils which, at least in the case of the first two U.S. Specifications, branch out from the main strands at a small angle.

SUMMARY OF THE INVENTION

It is desirable to be able to produce a biaxially-orientated structure with a single direction stretch. The structure so produced should be capable of having two clear axes, substantially at 90° to each other, though this may not be necessary in all circumstances. Thus it should be possible to have the orientated interconnecting strands substantially at right angles to the main strands, and certainly making a large angle to the main strands.

Definitions

The term "rectangular" includes square.

The term "orientated" means molecularly orientated.

The term "thickness" refers to the dimension normal to the plane of the starting material or mesh structure, the term "width" refers to the appropriate dimension in the plane of the starting material or mesh structure (normally at right angles to the direction of the strand in question), and the term "w:d ratio" is the ratio of the width to the thickness.

The "calculated stretch ratio of the interconnecting strands" is the ratio of the distance apart of the midpoints of the main zones after drawing to that before drawing (though normally the actual stretch ratio is less due to the main strands necking down slightly between connection points with the interconnecting strands).

The width of a main zone is generally the distance between the two lines which are tangent to the line of holes or depressions on either side of the main zone, the same being the case mutatis mutandis for main strands and mesh openings. A somewhat different definition applies to a ribbed structure (see below).

The depressions are not necessarily formed by the application of pressure.

In the method of the invention, the starting material has substantially parallel lines of holes or depressions defining elongate, side-by-side main zones between the lines of holes or depressions and intermediate zones between the holes or depressions in each line. The starting material is drawn in a direction substantially parallel to the main zones while preventing substantial contraction in the direction at right angles to the drawing direction, thereby stretching the main zones out into orientated main strands with the orientation therein extending from end to end and generally parallel to the drawing direction, decreasing the width of the main zones when forming the main strands, and simultaneously stretching the intermediate zones between the main zones in a direction at a large angle to the direction of drawing, whereby, in the mesh structure produced, orientated interconnecting strands, formed from the intermediate zones, interconnect the main strands, with the orientation in the interconnecting strands extending at a large angle to the main strands.

In the mesh structure of the invention, there are parallel, orientated main strands whose orientation extends from end to end thereof and generally parallel thereto, and orientated, interconnecting strands interconnecting the main strands, the interconnecting strands extending at a large angle to the main strands and having orientation which is directed generally parallel to the interconnecting strands. The mesh structures can be used to form laminates, particularly cross-laminates with the main strands of one mesh structure layer generally at right angles to the main strands of another mesh structure layer.

In the method of the invention, the main, parallel zones narrow down to form the main strands and thus stretch out the subsidiary intermediate or traverse zones into orientated interconnecting strands whose orientation is preferably at right angles to the direction of drawing, and calculated stretch ratios of 5:1 or more can be applied to the interconnecting strands. The orientation of the main strands extends from end to end thereof although they are interconnected by the interconnecting strands at a plurality of positions spaced along the main strands.

It has thus been discovered that a mesh structure which has substantial orientation in two directions at right angles can be produced by stretching a substantially unorientated starting material in a single direction. Nonetheless, as explained below, the invention is not restricted to using a single, unidirectional draw.

To facilitate the stretching of the "traverse" zones, these zones should not be too wide (i.e. should not have too great a dimension in the direction in which the main zones are stretched)—they are preferably substantially narrower than the main zones, e.g. one quarter the width or less, i.e. the distance between the holes or depression of one line and those of the adjacent line being at least four times the distance apart of the holes or depressions in any one line. The main strands can have a uniform thickness along their centre line (or another line parallel to their axes) and their width can also be fairly uniform. These main strands run right through the mesh structure and give the mesh structure its strength. Particularly if the mesh structure is being used for a cross-laid laminate (main strands of one mesh structure layer generally at right angles to the main strands of the other mesh structure layer), the transverse strength of the mesh structure is not of importance and need only be sufficient for machine handling in an automatic process; the interconnecting strands need only to keep the main strands roughly parallel prior to laminating. However, it is undesirable to stretch the main strands to such a degree that they fibrillate (if this is possible with the particular plastics material used).

It is believed that if the main zones or strands are to exhibit sufficient strength to orientate the intermediate zones, the interconnecting strands should be of smaller cross-sectional area than the main strands, and those cross-sectional areas are conveniently measured at the mid-points. The main strands can predominate in weight per square unit area of the mesh structure, for instance forming 85, 90, 95% or even more of the weight of the product, thus ensuring economic use of the plastics material.

In order to achieve this, and in order to achieve good cross-orientation, the distance between the main zones can be small (i.e. the main zones being close together), the holes or depressions (if present) being correspondingly small and forming a very low percentage of the surface area of the starting material. Apart from the foregoing, a small distance between the main zones (when the main zones are close together) can give good cross-orientation. A small percentage width reduction of the main zones can give a large stretch ratio on the intermediate or transverse zones. The main zones in the starting material are preferably at least two or four times as wide as the distance between such zones, if appreciable stretch is to be achieved in the interconnecting strands. There would be a large number of the side-by-side main zones, e.g. at least ten and preferably at least fifty or a hundred. Mesh structures can be produced with from fifty to four hundred main strands to the meter and one would expect mesh structure widths of one to four meters. The main strands will usually be of substantially rectangular section, i.e. two sides of the rectangle being the faces of the mesh structure.

If the starting material is to be drawn solely in the transverse direction (TD), a stenter can be used. In general, the holes or depressions in each line should be close together to achieve the cross orientation of the intermediate zones—the intermediate zones would thus be small, as measured in the direction in which the starting material is drawn.

Though one can use a single, unidirectional draw, it may be possible or advantageous to draw the starting material biaxially. Thus the starting material can be drawn, e.g. to a small stretch ratio, in the direction at right angles to the main zones. This drawing will orientate the intermediate zones to a certain extent, though the orientation need not penetrate into the sides of the main zones (i.e. pass beyond notional lines on either side of a respective main zone and tangent to the holes or depressions). The stretch ratio on the interconnecting strands so formed may be for instance 2:1. Subsequently (or even possibly simultaneously), the material is drawn parallel to the main zones, stretching out the main zones but also further stretching out the interconnecting strands in a direction parallel to their axes. The whole operation could be performed by giving a small machine direction (MD) draw using draw rolls and then giving a large TD draw in a stenter.

As a further possibility, once the main strands have been formed, it is possible to draw in the direction at right angles to the main strands, further to stretch out the interconnecting strands, possibly reducing or eliminating the thicker small zones referred to below.

In general, in the mesh structures of the invention, the ratio of main strand width: transverse pitch of main strands, as measured at mid-points (which are usually the narrowest points) of the main strands, is preferably below 1:5, say from 1:4.5 or 1:4.25 or 1:4 down to 1:2, though larger relative transverse pitches are possible with suitable dimensioning of the starting material—the main strands at their narrowest points may be separated by a distance of not more than three times their width at their narrowest points.

The production of the correct mesh structure depends upon a combination of various parameters, such as pitching of the holes or depressions (i.e. transverse dimension of the individual intermediate zones and width of main zones) and draw ratio applied to the main zones. The main zones in the starting material and the main strands in the mesh structure are preferably much wider than they are thick and hence tape-like, preferred w:d ratios for both the main zones and the main strands being at least about 5:1, or at least about 10:1, or at least about 20:1. If the main zones are not very close together, high w:d ratios are required. The actual thickness, if uniform, may not be of a great importance, though this has not been assessed experimentally. It is found easier to obtain more uniform thickness strands with very thin starting materials, the thickness normally becoming less uniform as the average thickness increases (i.e. less thickness difference between main strands and the interconnecting strands, and between different zones in the structure); it is found that starting materials of thickness of 0.5 mm and less are preferred, the most useful being those of 0.2 mm and less. However, in principle, the starting material can be of any suitable thickness.

The preferred starting material is strictly uniplanar, by which is meant that, ignoring any membrane (which may not lie on the median plane), all parts of the starting material are symmetrical about the median plane of the starting material; in this manner, in the mesh structure, all parts will be symmetrical about the median plane, ignoring any membrane, film or fibrils which may not lie on the median plane produced from the starting membrane. It is further preferred that the starting material should have planar faces apart from the holes or depressions. However insubstantial departures from uniplanarity or from planarity are not excluded—for instance, in an alternative to having starting material with planar faces, it would be possible to provide the starting material with parallel ribs, which could be formed by direct extrusion or embossing, the ribs forming the main zones (in this case, the width of a main zone is the width of the rib).

The holes (or depressions if applicable) can be formed e.g. by punching, slitting, embossing or burning in (on a water-cooled roller), or by forming them as the starting material itself is formed (for instance obturating a slit die e.g. generally as in French Pat. Specification No.

368 393 or by integral extrusion of a square mesh as in U.S. Pat. No. 3,325,181). Slitting is a useful way of forming the holes as there is no substantial material removal and as it enables the main zones to be very close together. A useful process is that in which a plastics sheet is formed with longitudinal slits, and is then heated whilst its longitudinal margins are restrained, forming roughly elliptical holes. In general, it is preferred to avoid any substantial protuberance around the periphery of the holes or depressions. If depressions are formed, the membrane closing the depressions can be ruptured during stretching and the residual film-like material removed; alternatively, an orientated film can remain in the mesh openings.

The starting material is preferably not substantially orientated, though melt-flow orientation can be present.

The starting material can be any suitable thermoplastics material, such as for instance high density polyethylene (HDPE), low density polyethylene, polypropylene, copolymers of HDPE and polypropylene, polyesters, and polyamide. Tape-like filaments tend to crank or split when produced from some plastics such as HDPE and polypropylene, but these may be acceptable for certain uses—the use of polyesters can reduce the tendency to crack or split. The starting material can have a skin on one or both faces containing an ultra-violet stabiliser; if a laminate is formed and the skin is on one face, it would be on the outside face.

The intermediate zones are stretched (and hence usually the axes and direction of orientation of the interconnecting strands will extend) at a large angle to the direction of drawing the starting material; this angle is preferably roughly 90°, but the angle could be substantially less than 90° though it is preferably more than 75°. Thus, though the interconnecting strands preferably extend substantially at right angles to the main strands, this need not be so; the interconnecting strands need not have any specific geometrical shape nor be aligned with any interconnecting strand on the other side of the respective main strand—for instance, the interconnecting strands could form the "verticals" in a "brick wall" pattern with the main strands forming the "horizontals".

The mesh structure can be very flat and thus easily laminated to provide good cross-laid laminates. Although there may be small zones of thicker and unorientated or less orientated material where the interconnecting strands join the main strands, there need be no large-sized nodules which could interfere with bonding. The structure may be cross-laminated with a similar or identical structure, but this is not necessarily so. The structures can be bonded directly face to face or can be separated by at least one further layer.

The mesh structure of this invention can have a high strength in the direction of the main strands and thus the cross-laid laminate will have good strength characteristics in two directions at right angles. As the mesh structure of the invention can be formed and laminated at much greater speeds than fabrics can be woven or knitted, the invention renders possible the fabrication at relatively high speeds of a material which can be substituted for woven fabrics for some purposes.

The mesh structure of this invention can be used without lamination, i.e. as an unlaminated material.

BRIEF DESCRIPTION OF THE DRAWINGS

The invention will be further described, by way of example, with reference to the accompanying drawings, in which.

Figure 1:
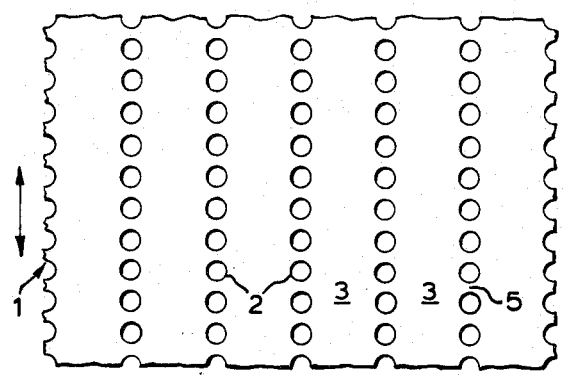
FIG. 1 is a plan view of a plastics starting material for forming a mesh structure in accordance with the invention.
Figure 2:
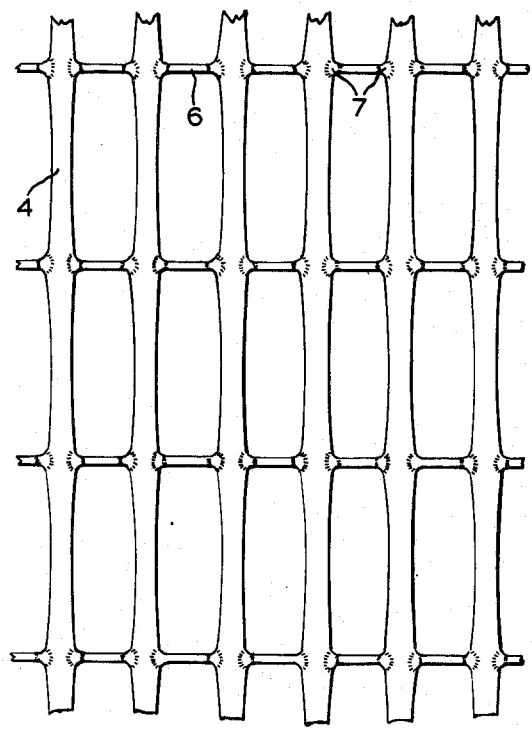
FIG. 2 is a plan view of the mesh structure formed therefrom.
Figure 3:
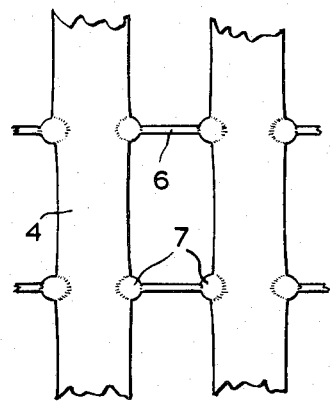
FIGS. 3 and 4 are plan views of two further mesh structures in accordance with the invention.
Figure 4:
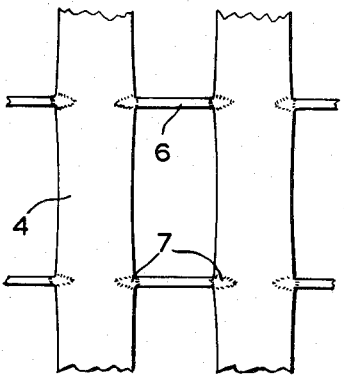
Figure 5:
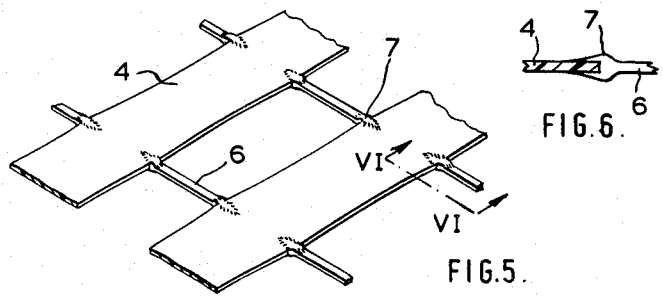
FIG. 5 is a perspective view of the mesh structure of FIG. 4.
Figure 6:
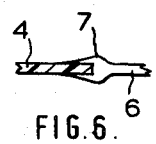
FIG. 6 is a section along the plane VI—VI in FIG. 5.

In the drawings, the hatchings run up and down the slope; only sample contoured zones are indicated with hatchings.

DESCRIPTION OF THE PREFERRED EMBODIMENTS

FIGS. 1 to 5

Figure 7:
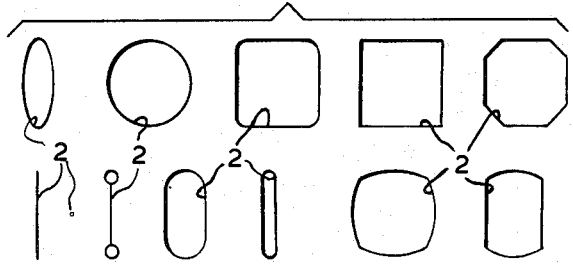
FIG. 7 shows various shapes of holes or depressions that can be used in the starting material.

Looking at FIG. 1, the starting material is a sheet of plastics material 1 having planar faces and in which are formed lines of holes or depressions 2, the holes or depressions 2 in each line being close together and dividing the starting material 1 into a large number of parallel main zones 3 which are close together and on either side of or separated by the lines of holes or depressions 2. The holes or depressions 2 preferably have their centres on a notional rectangular grid and the area of the holes or depressions 2 is preferably less than 20% of the plan view of the starting material 1. For the purpose of illustration and for most of the following Examples, the holes or depressions 2 are shown as circular, but FIG. 7 shows various shapes for the holes or depressions 2, including simple piercings and slits. Although circular holes or depressions are easier for tooling, it is suggested that square holes on the square, with radiussed corners (FIG. 7, middle of top row) give better control during stretching and a better, more regular product—"on the square" means that the sides of the square are parallel to and at right angles to the stretch direction. If elongated, the direction in which the major axis of the hole or depression 2 extends can be either parallel to the lines of holes or depressions 2 or at right angles thereto.

The starting material 1 is drawn only in the direction indicated by the double arrow in FIG. 1, while preventing any substantial contraction of the web of material as a whole in the direction at right angles to the drawing direction. The main zones 3 in the starting material 1 are stretched out into orientated, rectangular section main strands 4 (FIG. 2) which are like tapes or filaments running right through the structure, their orientation extending longitudinally thereof and from end to end thereof and their centre lines having substantially uniform thickness. At the same time, the width of the main zones 3 decreases; the small transverse or intermediate zones 5 between the main zones 3 and between the holes or depressions 2, are stretched at right angles to the direction of drawing, to form smaller cross-sectional area, orientated, transverse, interconnecting strands 6 interconnecting the main strands 4 at a plurality or large number of positions spaced along the main strands 4, with the orientation extending longitudinally of the interconnecting strands 6, i.e. at right angles to the drawing direction. In the generally rectangular mesh openings formed, the largest dimension parallel to the main strands 4 is substantially greater than that at right angles to the main strands 4. The width of the interconnecting strands 6 is substantially less than that of the main strands 4 whilst the orientation of (or stretch ratio applied to) the interconnecting strands 6 may be substantially more than that applied to the main strands 4, though this is not essential. The stretch ratio of the interconnecting strands 6 is determined by the diameter or width of the holes or depressions 2 and the reduction in width of the main zones 3 when forming the main strands 4. The main zones 3 should decrease in width by at least 50%, as measured at their narrowest parts. According to the stretch ratio applied, small thicker zones 7 (small blobs and/or unstretched shoulders) may remain adjacent each end of each interconnecting strand 6. The zones 7 may be thicker than both the main and interconnecting strands 4,6, or just thicker than the main strands 4. The zones 7 need not necessarily be present; for instance with polyester, the corresponding zones may be flat or have slight depressions, indicating that biaxial orientation has occurred in such zones (this possibly occurs even if there are blobs or shoulders). No account is taken herein of the small zones 7, or of the depressions, when giving the stretch ratios on the interconnecting strands 6, i.e. it is assumed that the whole of each interconnecting strand 6 stretched out uniformly, although this may not be the case.

The stretching is carried out at a temperature above the second order transition temperature (glass transition temperature) of the plastics material but substantially below the softening point so that melt flow orientation is avoided during the stretching; for example for HDPE, the preferred temperature range is 75° to 102° C. After stretching, the structures can be annealed in a well known manner.

FIG. 7

As indicated above, FIG. 7 shows various shapes of holes or depressions 2 that can be used in the starting material.

EXAMPLES

To provide typical examples, a parallel-faced starting material was formed with holes on a notional rectangular grid. The square holes of Example 4 were "on the square".

The starting material was stretched at an elevated temperature. The following Table gives details of four Examples. All dimensions are in mm, unless otherwise specified. The starting material was planar and effectively parallel sided, though differences in thickness were noted in one starting material (used for Examples 1 and 2), the maximum and minimum thickness of the starting material being recorded as 0.28 and 0.21 mm (nominal 0.25 mm). In each Example, the maximum thickness of the product was at zone 7. Due to thickness variations in the starting materials (small in the case of Examples 3 and 4), there were variations in the dimensions observed in the products, but average values have been recorded for Examples 1 and 2 and typical values for Examples 3 and 4. In commercial production, closer thickness tolerances would be required of the starting material than those indicated for Examples 1 and 2.

TABLE

| Example | 1 | 2 | 3 | 4 |
|---|---|---|---|---|
| Figure in which illustrated | 2 | 3 | 4 | 4** |
| Material | 80/20 HDPE/LDPE* | | HDPE | HDPE |
| Thickness | 0.25 | | 0.5 | 4.5 |
| Hole shape | circular | circular | circular | square, radiussed corners |
| Hole size | 1.6 | 3.175 | 1.6 | 6.35 0.75 radius corners |
| Hole pitch (stretch direction) | 2.4 | 4.7 | 2.4 | 8 |
| Hole pitch (transverse) | 6.36 | 12.7 | 12.7 | 25.4 |
| w:d ratio main zones | 19:1 | 38:1 | 22:1 | 4.2:1 |
| Temperature of Stretching (°C.) | 75–85 | 75–85 | 90 | 96 |
| Stretch ratio on longitudinal strands | 7:1 | 3.5:1 | 9:1 | 5.6:1 |
| Longitudinal strand width reduction (measured at mid-point) | 65% | 38% | 44% | 53% |
| Maximum opening size, measured in transverse direction | 4.9 | 7.2 | 6.5 | 15.5 |
| Calculated stretch ratio on interconnecting strands | 3.03:1 | 2.26:1 | 4.06:1 | 2.58:1 |
| Longitudinal strand thickness (mid point = thinnest point) | 0.08 | 0.07 | 0.16 | 1.78 |
| Longitudinal strand width (mid-point = narrowest part) | 1.5 | 5.5 | 6.2 | 9.0 |
| w:d ratio longitudinal strand | 19:1 | 79:1 | 39:1 | 5:1 |
| Interconnecting strand thickness (mid-point) | 0.08 | 0.07 | 0.20 | 2.5 |
| Interconnecting strand width (mid-point) | 0.3 | 0.3 | 0.5 | 1.0 |
| Thickness of thickest point of structure | 0.18 | 0.18 | 0.45 | 3.3 |

*Co-extrusion (one-sided)
**Closest Figure

FIG. 8

Figure 8:
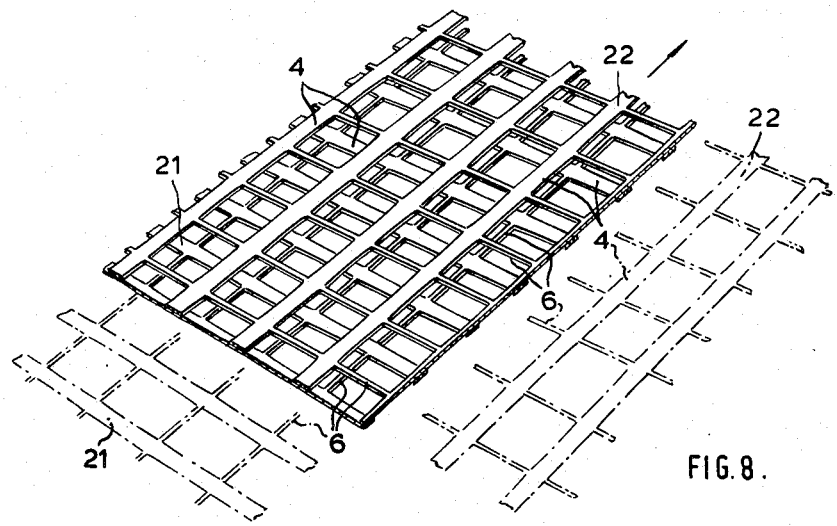
FIG. 8 is a schematic perspective view of a laminate in accordance with the invention.

A cross-laid laminate is shown in FIG. 8, and can be considered as having been made in a machine whose machine direction (MD) is indicated by the arrow. The laminate is formed of two layers 21, 22, each of which can be generally in accordance with any of FIGS. 2, 3, or 4. The top layer 22 has been stretched in the MD and the bottom layer 21 has been stretched in the transverse direction (TD).

The bonding is preferably effected by providing a multi-component starting material, having on at least one face a bonding material which bonds at a temperature which does not destroy the physical properties of the mesh structure, the two mesh structure layers being heated to bond them—thus the bonding material can be a skin which melts or becomes tacky at a temperature (or temperature and pressure) at which the main component of the mesh structure would not de-orientate. The bonding material may be for instance ethylene vinyl acetate or low density polyethylene (LDPE); the starting material can for instance be unorientated 0.15 mm thick polypropylene with a thin layer of LDPE on at least one face. The bonding material can be provided in any suitable way, for instance by extrusion coating or co-extrusion. Alternatively, a bonding material or adhesive can be applied immediately prior to laminating.

FIGS. 9 to 14

Figure 9:
FIGS. 9 to 14 are schematic sections through six other laminates in accordance with the invention.
Figure 10:
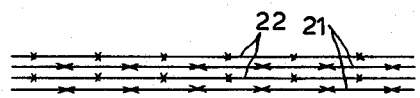
Figure 11:
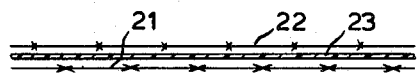
Figure 12:
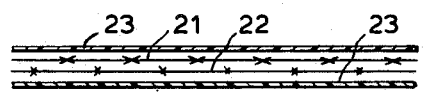
Figure 13:
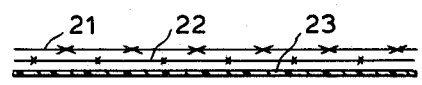
Figure 14:
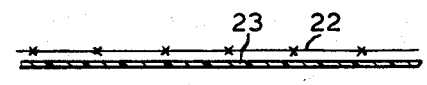

In FIGS. 9 to 14 MD stretched layers are indicated as 21 and TD stretched layers are indicated as 22, although in the alternative these could be reversed. FIGS. 9 and 10 illustrate three-layer and four-layer laminates respectively. FIGS. 11 to 13 show the incorporation of one or more layers 23 of another material, e.g. polyethylene film. FIG. 14 shows the lamination of a layer which can be generally in accordance with FIGS. 2, 3 or 4, with a film 23 of plastics material, e.g. polyethylene film, which has a preferred or single direction of orientation (direction of maximum strength) at right angles to the main strands 4.

Uses

The single layer mesh structure of the invention can be used for: Sunshade cloth, wind-breaks, sand barriers (small thicknesses), civil engineering such as ground stabilisation or reinforcement (large thicknesses), general construction, such as concrete reinforcement, plaster reinforcement for ceiling panels or as a false ceiling, and asphalt reinforcement with the main strands extending transversely of the traffic direction (in this case, polyester is a preferred material).

The laminate of the invention can be used for or as an alternative to:

Textile fabrics for industrial application, wind-breaks, shade cloths, bases for needle felt, olive harvesting nets, packaging, tarpaulin, bale wraps, carpet backings, or sacks or bags e.g. for wool, cement (laminated with paper or film) or fertilizers.

I claim:

1. A method of making a plastics material mesh structure, comprising:
providing a plastics starting material which has a regular pattern of holes or depressions, the holes or depressions being in parallel lines, the distance between the holes or depressions of one line and those of the adjacent line being substantially greater than the distance between the holes or depressions in each line, the holes or depressions defining elongate, side-by-side main zones between the lines of holes or depressions and intermediate zones between the holes or depressions in each line, each of which intermediate zones is generally symmetrical about a line at right angles to the line of holes or depressions, the major part of the thickness of each intermediate zone being between planes defined by the outer faces of the main zones; and
drawing the starting material at a temperature above the glass transition temperature but low enough so that melt flow orientation is prevented, said drawing being only in a direction substantially parallel to the main zones while preventing substantial reduction of the pitch of the main zones though permitting reduction in width of each individual main zone, thereby stretching the main zones out into continuous, uniaxially-orientated main strands with the orientation therein extending substantially uniformly from end to end and generally parallel to the drawing direction, substantially decreasing the width of the main zones when forming the main strands, the distance between the holes or depressions of one line and those of the adjacent line being sufficiently greater than the distance between the holes or depressions in each line so that the force of contraction of each main strand as the main strand reduces in width causes said intermediate zones to stretch in a direction generally at right angles to the drawing direction to form discontinuous, uniaxially-orientated initerconnecting strands which interconnect the main strands, whereby a biaxially-orientated mesh structure is produced comprising said orientated main strands and said orientated interconnecting strands with the orientation in the interconnecting strands extending generally at right angles to the main strands and the cross-sectional area of the mid-points of the interconnecting strands being less than the minimum cross-sectional area of the main strands, and in which mesh structure there is adjacent each end of each interconnection strand a zone of plastics material which is thicker than the material of the remainder of the interconnecting strand.

2. The method of claim 1, wherein the starting material is subjected to a stretch in a direction at right angles to said drawing direction, prior to drawing the starting material in said drawing direction.

3. The method of claim 1, wherein, after drawing the starting material in said drawing direction, the mesh structure is drawn in a direction at right angles to said drawing direction.

4. The method of claim 1, wherein the ratio of the width to thickness of the main zones is about 20:1 or more.

5. The method of claim 1, wherein the ratio of the distance apart of the mid-points of the main zones after drawing to that before drawing is 5 or more 0:1.

6. The method of claim 1, wherein the starting material is drawn until the main zones have decreased in width by at least 50%, as measured at the narrowest parts of the main zones.

7. The method of claim 1, wherein two layers of said mesh structure are bonded together so that they are comprised in a laminate, said main strands of one said layer extending generally at right angles to said main strands of the other said layer.

8. The method of claim 1, wherein the main zones are substantially wider than they are thick.

9. The method of claim 8, wherein the main zones are generally rectangular in shape, as seen in section normal to said drawing direction.

10. The method of claim 1, wherein the ratio of the width to thickness of the main zones is about 5:1 or more.

11. The method of claim 1, wherein said holes or depressions are on a notional rectangular grid.

12. The method of claim 1, wherein said thicker zones are at least about 1.32 times as thick as the thickness of the mid-point of the interconnecting strands.

13. The method of claim 1, wherein said thicker zones are at least about 1.85 times as thick as the thinnest part of the main strands.

14. The method of claim 1, wherein the distance between the holes or depressions of one line and those of the adjacent line is at least about 2.975 times the width of the holes or depressions as measured at right angles to said direction substantially parallel to the main zones.

15. The method of claim 1, wherein the thickness of the starting material is about 0.5 mm or less.

16. The method of claim 1, wherein the product of the distance between the holes or depressions of one line and those of the adjacent line and the pitch of the mesh openings of the mesh structure in said drawing direction divided by the product of the width of the holes or depressions as measured in the direction at right angles to said drawing direction and the pitch of the holes or depressions in said drawing direction, is at least about 10.5.

17. The method of claim 1, wherein the pitch of the main strands in the direction at right angles to said drawing direction is less than about five times the width of the main strand at their narrowest parts.

18. The method of claim 1, wherein the main strands and the interconnecting strands define substantially rectangular mesh openings whose dimensions parallel to the main strands is substantially greater than their dimension parallel to the interconnecting strands.

19. The method of claim 1, wherein in said mesh structure the main strands contain at least 85% of said plastics material of said mesh structure.

20. The method of claim 1, wherein the main strands have substantially uniform thickness, as seen in section along their centre lines.

21. A method of making a mesh structure, comprising:

providing a plastics starting material which has a regular pattern of holes or depressions, the holes or depressions being in parallel lines, the distance between the holes or depressions of one line and those of the adjacent line being at least four times the distance between the holes or depressions in each line, the holes or depressions defining elongate, side-by-side main zones between the lines of holes or depressions and intermediate zones between the holes or depressions in each line; and each of which intermediate zones is generally symmetrical about a line at right angles to the line of holes or depressions, the major part of the thickness of each intermediate zone being between planes defined by the outer faces of the main zones; and drawing the starting material at a temperature above the glass transition temperature but low enough so that melt flow orientation is prevented, said drawing being only in a direction substantially parallel to the main zones while preventing substantial reduction of the pitch of the main zones though, permitting reduction in width of each individual main zone, thereby stretching the main zones out into continuous, uniaxially-orientated main strands with the orientation therein extending substantially uniformly from end to end and generally parallel to the drawing direction, substantially decreasing the width of the main zones when forming the mains strands, the distance between the holes or depressions of one line and those of the adjacent line being sufficiently greater than the distance between the holes or depressions in each line so that the force of contraction of each main strand as the main strand reduces in width causes said intermediate zones to stretch in a direction generally at right angles to the drawing direction to form discontinuous, uniaxially-orientated interconnecting strands which interconnect the main strands, whereby a biaxially-orientated mesh structure is produced comprising said orientated main strands and said orientated interconnecting strands with the orientation in the interconnecting strands extending generally at right angles to the main strands and the cross-sectional area of the mid-points of the interconnecting strands being less than the minimum cross-sectional area of the main strands, and in which mesh structure there is adjacent each end of each interconnection strand a zone of plastics material which is thicker than the material of the remainder of the interconnecting strand.

22. The method of claim 21, wherein the ratio of the width to thickness of the main zones is about 20:1 or more.

23. The method of claim 21, wherein the ratio of the distance apart of the mid-points of the main zones after drawing to that before drawing is 5 or more :1.

24. The method of claim 21, wherein the starting material is drawn until the main zones have decreased in width by at least 50%, as measured at the narrowest parts of the main zones.

25. A method of making a plastics material mesh structure, comprising:

providing a substantially unorientated, plastics starting material which has a regular pattern of holes or depressions, the holes or depressions being in parallel lines, the distance between the holes or depressions of one line and those of the adjacent line being substantially greater than the distance between the holes or depressions in each line, the holes or depressions defining elongate, side-by-side main zones between the lines of holes or depressions and intermediate zones between the holes or depressions in each line, each of which intermediate zones is generally symmetrical about a line at right angles to the line of holes or depressions, the major part of the thickness of each intermediate zone being between planes defined by the outer faces of the main zones; and drawing the starting material at a temperature above the glass transition temperature but low enough so that melt flow orientation is prevented, said drawing being only in a direction substantially parallel to the main zones while preventing substantial reduction of the pitch of the main zones though permitting reduction in width of each individual main zone, thereby stretching the main zones out into continuous, uniaxially-orientated main strands with the orientation therein extending substantially uniformly from end to end and generally parallel to the drawing direction, substantially decreasing the width of the main zones when forming the main strands, the distance between the holes or depressions of one line and those of the adjacent line being sufficiently greater than the distance between the holes or depressions in each line so that the force of contraction of each main strand as the main strand reduces in width causes said intermediate zones to stretch in a direction generally at right angles to the drawing direction to form discontinuous, uniaxially-orientated interconnecting strands which interconnect the main strands, whereby a biaxially-orientated mesh structure is produced comprising said orientated main strands and said orientated interconnecting strands with the orientation in the interconnecting strands extending generally at right angles to the main strands and the cross-sectional area of the mid-points of the interconnecting strands being less than minimum cross-sectional area of the main strands, and in which mesh structure there is adjacent each end of each interconnecting strand a zone of plastics material which is thicker than the material of the remainder of the interconnecting strand.

26. A method of making a plastics material mesh structure on a machine, comprising:

providing a substantially unorientated, plastic starting material which has a regular pattern of holes or depressions, the holes or depressions being in parallel lines, the distance between the holes or depressions of one line and those of the adjacent line being substantially greater than the distance between the holes or depressions in each line, the holes or depressions defining elongate, side-by-side main zones between the lines of holes or depressions and intermediate zones between the holes or depressions in each line, each of which intermediate zones is generally symmetrical about a line at right angles to the line of holes or depressions, the major part of the thickness of each intermediate zone being between planes defined by the outer faces of the main zones, said lines extending in the machine direction;

subjecting the starting material to a small stretch in a direction substantially at right angles to said machine direction; and drawing the starting material at a temperature above the glass transition temperature but low enough to that melt flow orientation is prevented, said drawing being in said machine direction while preventing substantial reduction of the pitch of the main zones though permitting reduction in width of each individual main zone, thereby stretching the main zones out into continuous, uniaxially-orientated main strands with the orientation therein extending substantially uniformly from end to end and generally parallel to the machine direction, substantially decreasing the width of the main zones when forming the main strands, the distance between the holes or depressions of one line and those of the adjacent line being sufficiently greater than the distance between the holes or depressions in each line so that the force of contraction of each main strand as the main strand reduces in width causes said intermediate zones to stretch in a direction generally at right angles to the machine direction to form discontinuous, uniaxially-orientated interconnecting strands which interconnect the main strands, whereby a biaxially-orientated mesh structure is produced comprising said orientated main strands and said orientated interconnecting strands with the orientation in the interconnecting strands extending generally at right angles to the main strands and the cross-sectional area of the mid-points of the interconnecting strands being less than the minimum cross-sectional area of the main strands, and in which mesh structure there is adjacent each end of each interconnecting strand a zone of plastics material which is thicker than the material of the remainder of the interconnecting strand.

27. A method of making a plastics material mesh structure, comprising:

providing a plastics starting material which has a regular pattern of holes or depressions, the holes or depressions being in parallel lines, the distance between the holes or depressions of one line and those of the adjacent line being substantially greater than the distance between the holes or depressions in each line, the holes or depressions defining elongate, side-by-side main zones between the lines of holes or depressions and intermediate zones between the holes or depressions in each line, each of which intermediate zones is generally symmetrical about a line at right angles to the line of holes or depressions, the major part of the thickness of each intermediate zone being between planes defined by the outer faces of the main zones; and drawing the starting material at a temperature above the glass transition temperature but low enough so that melt flow orientation is prevented, said drawing being only in a direction substantially parallel to the main zones while preventing substantial reduction of the pitch of the main zones though permitting reduction in width of each individual main zone, thereby stretching the main zones out into continuous, uniaxially-orientated main strands with the orientation therein extending substantially uniformly from end to end and generally parallel to the drawing direction, substantially decreasing the width of the main zones when forming the main strands, the distance between the holes or depressions of one line and those of the adjacent line being sufficiently greater than the distance between the holes or depressions in each line so that the force of contraction of each main strand as the main strand reduces in width causes said intermediate zones to stretch in a direction generally at right angles to the drawing direction to form discontinuous, uniaxially-orientated interconnecting strands which interconnect the main strands, whereby a biaxially-orientated mesh structure is produced comprising said orientated main strands and said orientated interconnecting strands with the orientation in the interconnecting strands extending generally at right angles to the main strands and the cross-sectional area of the mid-points of the interconnecting strands being less than the minimum cross-sectional area of the main strands.

* * * * *